(12) United States Patent
Sims et al.

(10) Patent No.: US 8,590,024 B2
(45) Date of Patent: *Nov. 19, 2013

(54) METHOD FOR GENERATING DIGITAL FINGERPRINT USING PSEUDO RANDOM NUMBER CODE

(75) Inventors: John B Sims, Littleton, CO (US); Mykola P Samoylov, Centennial, CO (US)

(73) Assignee: The Boeing Company, Chicago, IL (US)

( * ) Notice: Subject to any disclaimer, the term of this patent is extended or adjusted under 35 U.S.C. 154(b) by 1284 days.

This patent is subject to a terminal disclaimer.

(21) Appl. No.: 11/670,007

(22) Filed: Feb. 1, 2007

(65) Prior Publication Data

US 2008/0189772 A1    Aug. 7, 2008

(51) Int. Cl.
*H04L 29/06*    (2006.01)

(52) U.S. Cl.
USPC .............. 726/7; 713/168; 713/176; 713/180; 726/2; 726/5

(58) Field of Classification Search
USPC ................. 713/168, 176, 180; 726/2, 5, 7
See application file for complete search history.

(56) References Cited

U.S. PATENT DOCUMENTS

| | | | | |
|---|---|---|---|---|
| 5,604,803 | A * | 2/1997 | Aziz | 713/155 |
| 6,128,661 | A * | 10/2000 | Flanagin et al. | 709/227 |
| 2002/0078352 | A1 * | 6/2002 | Angwin et al. | 713/169 |
| 2004/0010685 | A1 | 1/2004 | Sakaguchi et al. | |
| 2005/0235148 | A1 * | 10/2005 | Scheidt et al. | 713/168 |
| 2007/0113090 | A1 * | 5/2007 | Villela | 713/170 |

FOREIGN PATENT DOCUMENTS

WO    WO 2005/107137    11/2005

OTHER PUBLICATIONS

Menezes et Al., Handbook of Applied Cryptography, Oct. 1996, CRC Press, ISBN: 0-8493-8523-7, p. 395-397.*
"The Whirlpool Hash Function", http://paginas.tera.com.br/informatica/paulobarreto/WhirlpoolPage.html, Jan. 5, 2007, 5 pages.
Oorschot Van et al., "Handbook of Applied Cryptography", Boca Raton, FL, CRC Press, XP-002134672, Jan. 1, 1997, pp. 395-397.

* cited by examiner

*Primary Examiner* — Jeffrey Pwu
*Assistant Examiner* — Thomas C Lauzon
(74) *Attorney, Agent, or Firm* — Harness, Dicke & Pierce, P.L.C.

(57)    ABSTRACT

A method for authenticating the identity of a client device that is attempting to establish a communications link with a remotely located system server over a network. The method involves initially generating a unique registration ID code by inputting information pertaining to hardware characteristics of the client device itself, and a network address of the client device, into a cryptographic hash function. The hash function generates the unique registration ID hash code and presents it to the system server. The system server uses this registration ID hash code to authenticate the identity of the client device making the call. The system server then generates a pseudo random number (PRN), and transmits it to the client device. The PRN is used the next time the client device makes a call to the system server to generate a unique, client-side hash code, which is used by the system server to authenticate the identity of the client device.

18 Claims, 4 Drawing Sheets

METHOD FOR GENERATING DIGITAL FINGERPRINT USING PSEUDO RANDOM NUMBER CODE

FIELD

The present disclosure relates to methods for authorizing and verifying the identity of a first device that is attempting to access, over a network, a second device, and more particularly to a method for generating a digital fingerprint for a client device using a pseudo random number.

BACKGROUND

The statements in this section merely provide background information related to the present disclosure and may not constitute prior art.

The distribution of information from a system, for example a system server, to a client device that is communication with the system server via network, requires an assurance that the client device is authorized to receive the content that it is requesting from the system server. This is especially so with automated or "hands-free" distribution of information from a system to a client device. The client device must be uniquely identified and known to the system before the system transmits information to the client device. Put differently, the identity of the client device must be verified by the system server before the system server begins releasing information to the client device.

Existing approaches that attempt to provide assurance of the identity of a requesting device often have relied on the use of computer names, user names, or installed software on the client device. Such security measures, by themselves, are often easily defeated by unauthorized third parties or "hackers". This can result in confidential or sensitive information being misdirected from the system server to a non-authorized device that has accessed the network and is attempting to communicate with the system server.

Attempts to alleviate the shortcomings of pre-existing assurance systems have often involved cumbersome procedures that must be followed by a client device or individuals associated with operation of a client device. Such systems have often resulted in additional costs, but with little real additional security being gained.

SUMMARY

The present disclosure is directed to a method for assuring the identity of a first device that is attempting to access and obtain information from a second device on a network. In one example, the first device comprises a client device and the second device comprises a system or server having information that the client device is attempting to obtain.

In one implementation the method involves performing an initial registration process for the client device. The registration process involves reading a network address of a component of the client device, in addition to reading a predetermined piece of information from the client device that pertains to a hardware component incorporated in the client device. A cryptographic program is used to receive the network address and the predetermined piece of information as inputs and to generate therefrom a registration Identification (ID) code for the client device.

For the initial registration procedure, the client device supplies the registration ID code, and at least one additional piece of user identifying information, to the system when making a call to the system over the network. The identifying information will be known to the system in advance. The system uses the piece of user identifying information as an initial verification of the authenticity of the identity of the client device. The system then generates a pseudo random number (PRN) code. The PRN code is transmitted from the system to the client device where it may be used by the client device with each subsequent communication that it transmits to the system. The PRN code is stored by the client device preferably only right before the present call with the system is terminated. Similarly, the system preferably does not store the PRN code on a mass storage device of its own until just before the call is terminated.

When the client device calls the system at a future time to initiate a new information exchange session (i.e., after the initial registration process has been completed), the client device uses its stored PRN code to help generate a new, unique, one time only ID code that can be used to authenticate its identity to the system. The client device does this by using the stored PRN code as an input for its PRN generator, which results in a new PRN code being generated. The new PRN code will be the next number in a PRN sequence. The registration ID code is also regenerated by using the hardware and network address inputs as described above for the initial registration process. Once the registration ID code has been regenerated, it and the new PRN code may then be input to the cryptographic program associated with the client device to generate a unique, one time only, client-side hash code. This one time only, client-side hash code essentially represents a new, one time only digital fingerprint for the client device.

The system performs a similar operation at its side. The system uses the previously stored PRN code generated during the initial registration process as an input to its PRN generator to generate a new PRN code. The new PRN code is used with the stored registration ID code for the particular client device now making the new call to the system, as an input to its associated PRN generator to generate a new PRN code, which represents the next PRN code in a PRN sequence. In this regard it will be appreciated that the PRN generators used by the client device and the system are the same, and will thus always produce the exact same output given the exact same input.

The system then uses the new PRN code it has just generated as an input, together with the previously stored registration ID code, to its associated cryptographic hash program. The cryptographic hash program generates a one time only, system-side, unique hash code. The cryptographic hash program is identical to the hash program being used by the client device. The system then compares the client-side hash code that it has just received, with the system-side hash code that it has just generated, to see if they match. If they do, then the identity of the client device making the new call to the system is authenticated. The system then allows further communication between it and the client device to proceed. If a match does not exist, then the system terminates the call. The new PRN code is stored by both the client device and the system, but preferably not until just before concluding communication.

In one exemplary implementation, the above-described registration program operating on the control device reads a network address of a network card of the client device and a volume serial ID number of a mass storage device on the client device. The user identifying information supplied by the user with the registration ID code when making a call to the system may comprise one or more of a user name, user password and user selected device name for the client device.

A particular advantage of the method of the present disclosure is that a unique, one time only identifying digital "fingerprint" is generated by the client device every time the client device makes a new call to the system, and a new PRN code is supplied by the system to the client device when the identity of the client device is authenticated.

The various implementations of the method of the present disclosure provide exceptionally strong security for authenticating the identity of the client device without requiring significant cooperation, expense, or significant technical steps to be taken by operators of the client device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
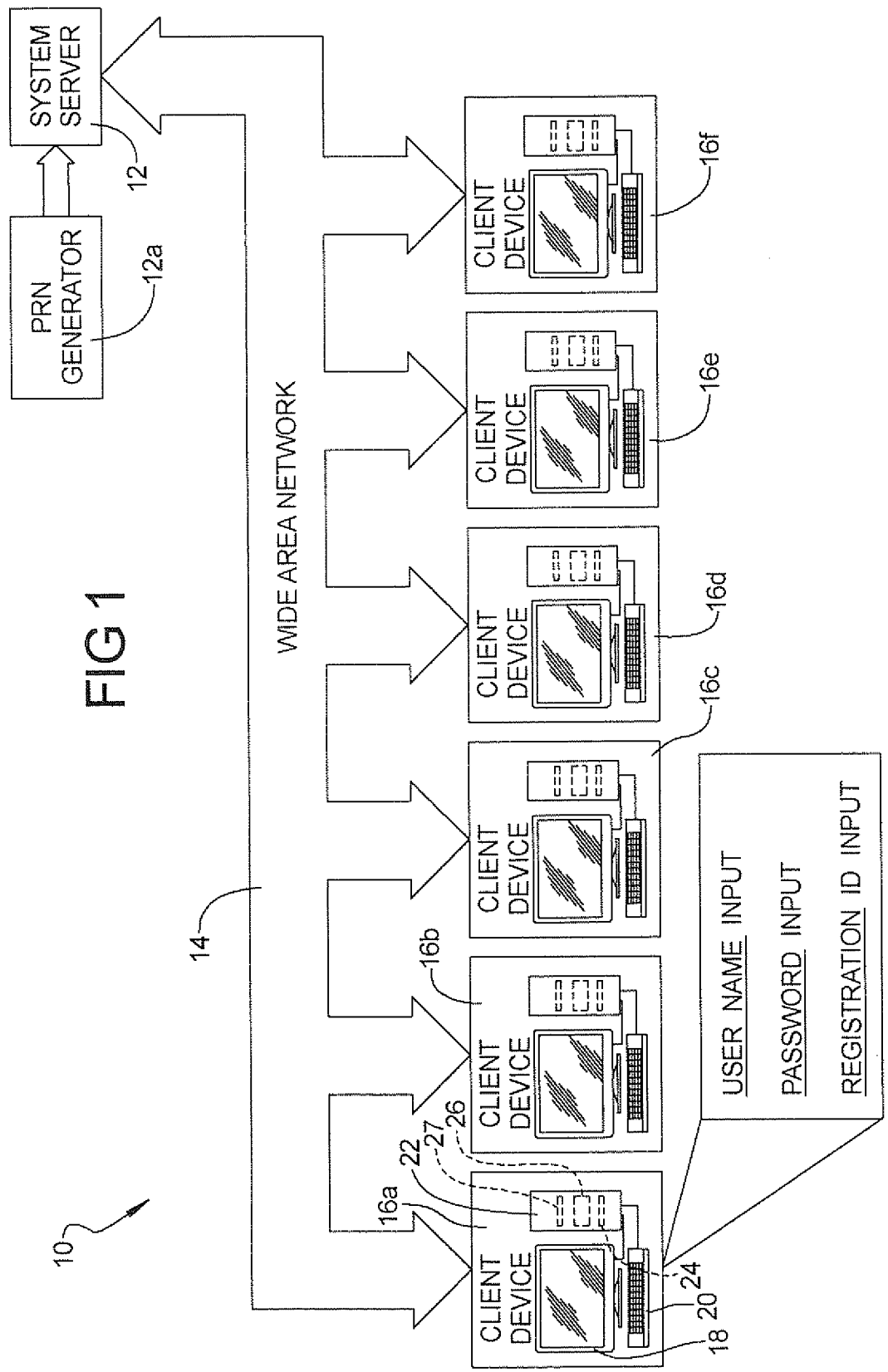
FIG. 1 is an environmental block view diagram illustrating a typical environment in which the method of the present disclosure may be employed, in which a client device is in communication over a wide area network with a remotely located system server.

Referring to FIG. 1, a system 10 is shown that makes use of the method of the present disclosure. In this example, the system 10 includes a system server 12 that is remotely coupled via a wide area network 14, for example the Internet, with at least one client device 16a-16f. The illustration of a plurality of client devices 16a-16f is merely meant to illustrate that in a typical scenario more than one client device 16 will often be operating on the network and capable of bi-directional communication with the system server 12. The system server 12 includes a pseudo random number (PRN) generator 12a.

The client devices 16a-16f typically each comprise computer terminals that each include a display terminal 18, a keyboard 20 for data entry, and a computing module 22. The computing module 22 typically includes a networking card 24 and a mass storage device, for example a hard disc drive 26. Each client device 16 includes a pseudo random number (PRN) generator 27 that may be stored on the hard disc drive 26. The PRN generator 27 is preferably a robust PRN generator known to have a high periodicity. The client devices 16a-16f may each be identical or they may be of slightly different configurations, but in any event each represents a computing device that is able to make a call to the system server 12 and bi-directionally communicate over the wide area network 14 with the system server 12.

Figure 2:
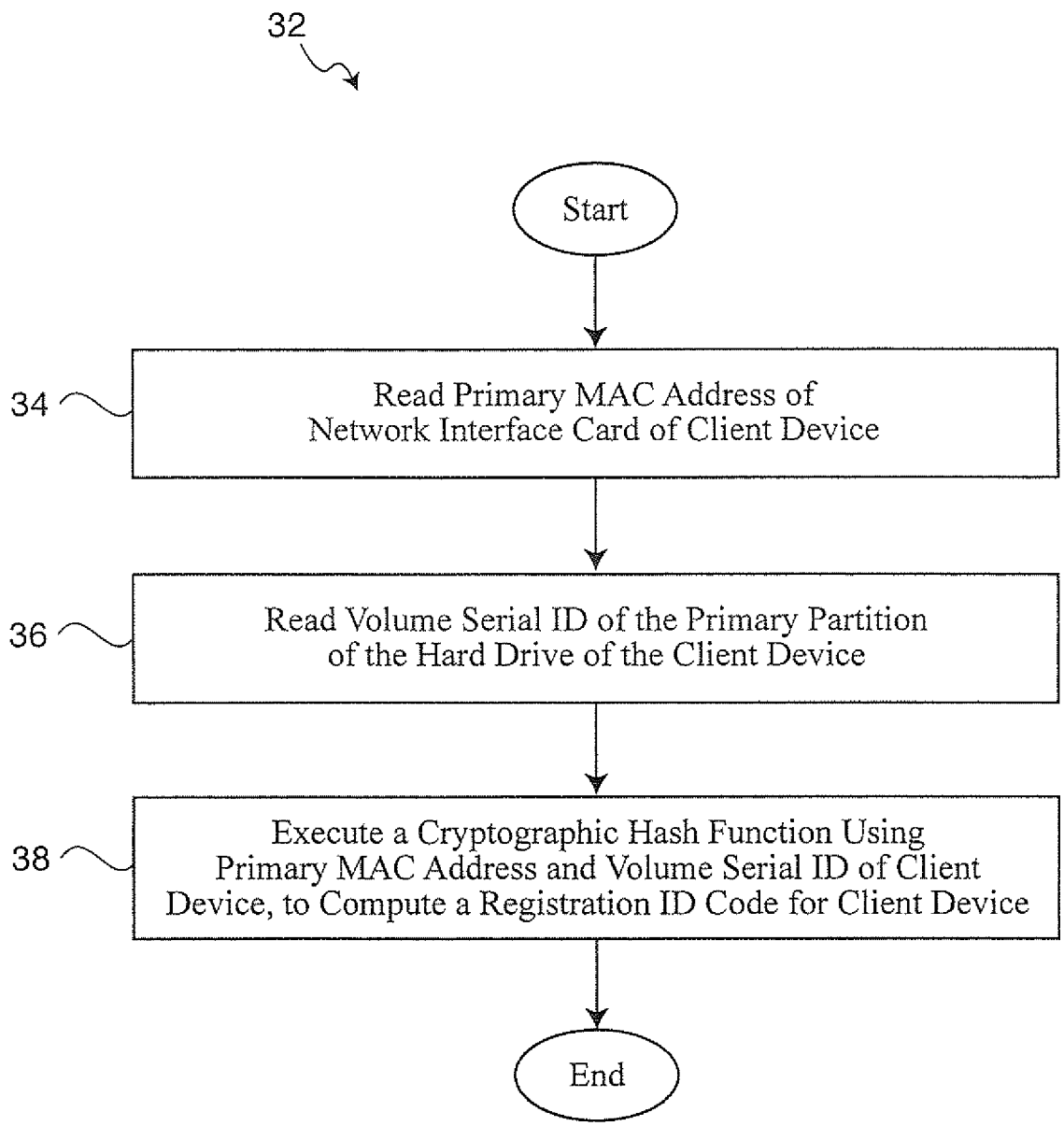
FIG. 2 is a flowchart of an exemplary method for generating a registration ID code for the client device shown in FIG. 1.

Referring to FIG. 2, a flowchart 32 illustrates an exemplary process for generating a registration Identification (ID) code in accordance with one implementation of the method of the present disclosure. The generation of a registration ID code enables a unique code to be created that takes into account specific hardware features of the particular client device 16 that will be making contact with the system server 12 in an attempt to obtain information from the system server 12. A particular advantage is that the registration ID code created from the operations of flowchart 32 is uniquely tied to the particular client device 16 making the call to the system server 12.

In operation 34 the primary MAC address of the network interface 24 in the computing module 22 of the client device 16 is read. In operation 36, the volume serial ID number of the primary partition of the hard drive 26 of the computing module 22 is read. In operation 38, a cryptographic hash function is executed by the client device 16 using the primary MAC address and the volume serial ID number of the client device 16, to thus generate a registration ID code for the client device 16. It will be appreciated that the operation set forth in FIG. 2 is performed each time a new call is made by the client device 16 to establish a new information exchange session with the system server 12, and is required to be performed before information from the system server 12 will be transmitted to the client device 16.

The cryptographic hash function performed in operation 38, in this example, is preferably a one-way cryptographic function that generates a unique sequence of bits or "hash code". One specific type of cryptographic hash function that is suitable for use is known as the "Whirlpool" cryptographic hash function developed by V. Rijmen and P. Barreto, The Whirlpool cryptographic hash function operates on messages less than $2^{256}$ bits in length, and produces a message digest of 512 bits. The cryptographic hash function can be mathematically proven to generate a given hash code, given the same inputs, each time it is executed. Furthermore, given the hash code alone, the inputs to the hash function are virtually impossible to deduce. The hash function is further highly resistant to attempts to guess the inputs by repeated, minor modifications to the inputs and then repeatedly examining the resulting hash code.

Another significant benefit of the registration ID code is that it is automatically computed from the underlying hardware environment of each client device 16 each time the client device 16 is used. Thus, the registration ID code is never stored on the hard drive 26 of the client device 16, and is therefore not susceptible to hacking or other form of loss from other devices that may gain unauthorized access to the network.

Figure 3:
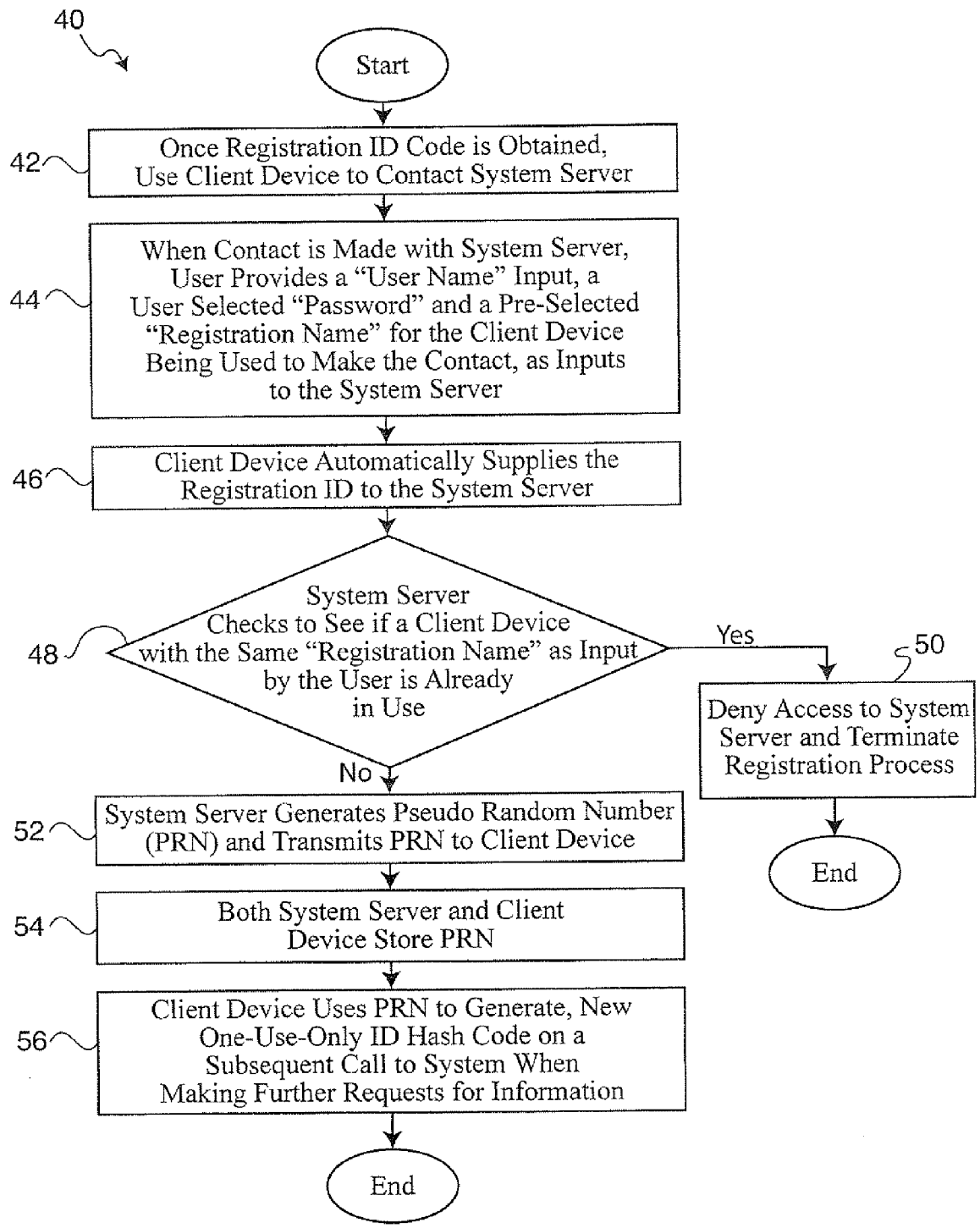
FIG. 3 is a flowchart of an exemplary procedure for initially registering the client device for use with the system server.

Referring now to FIG. 3, an initial registration process 40 is presented that enables a given client device 16 to be registered for use with the system server 12. In operation 42, once the registration ID code is generated, the client device 16 is used to call the system server 12. In operation 44, when initial contact is made with the system server 16, the user operating the client device 16 preferably provides a pre-selected "User Name", a pre-selected "Password" and a pre-selected "Registration Name", as inputs to the specific client device 16 that is being used to make the call to the system server 12. It is preferred that all three such inputs are provided, although it will be appreciated that a high level of security would still be obtained even if only one or two of the above-mentioned user selected identifying items were supplied. The "User Name", "Password" and "Registration Name" will be previously known to the system server 12.

In operation 46, the client device 16 automatically supplies the registration ID code that has been immediately, previously generated by the registration software program, to the system server 16. In operation 48, the system server 16 checks to see if a different client device with the same "Registration Name" as that input by the user is already in use. If the answer to this inquiry is "YES", then access to the system server 12 is denied, as indicated at operation 50, and the process of registering the client device 16 with the system server 12 is terminated. If the answer to the inquiry in operation 48 is "NO", then the "Registration Name" and the "registration ID code" provided by the client device 16 are stored in the system server 12 (i.e., on a suitable mass storage device associated with the system server 12).

At operation 52, the system server 12 uses its PRN generator 12a to generate a PRN code and transmits this PRN code to the client device 16 that is making the call. At operation 54, both the system server 12 and the client device 16 store the PRN code. The PRN code may be stored on the hard disc drive 26 of client device 16. The system server 12 may store the PRN code on any form of suitable mass storage device (hard disc drive, magnetic tape storage device, etc.) that it is operably associated with. In operation 56, the client device 16 uses the stored PRN code when making a future call to the system server 12. The PRN code is used to help generate a new, unique, one time only ID hash code that effectively acts as a digital fingerprint for the client device 16 when the client device 16 makes a future call to the system server 12. This will be explained further in the following paragraphs.

Figure 4:
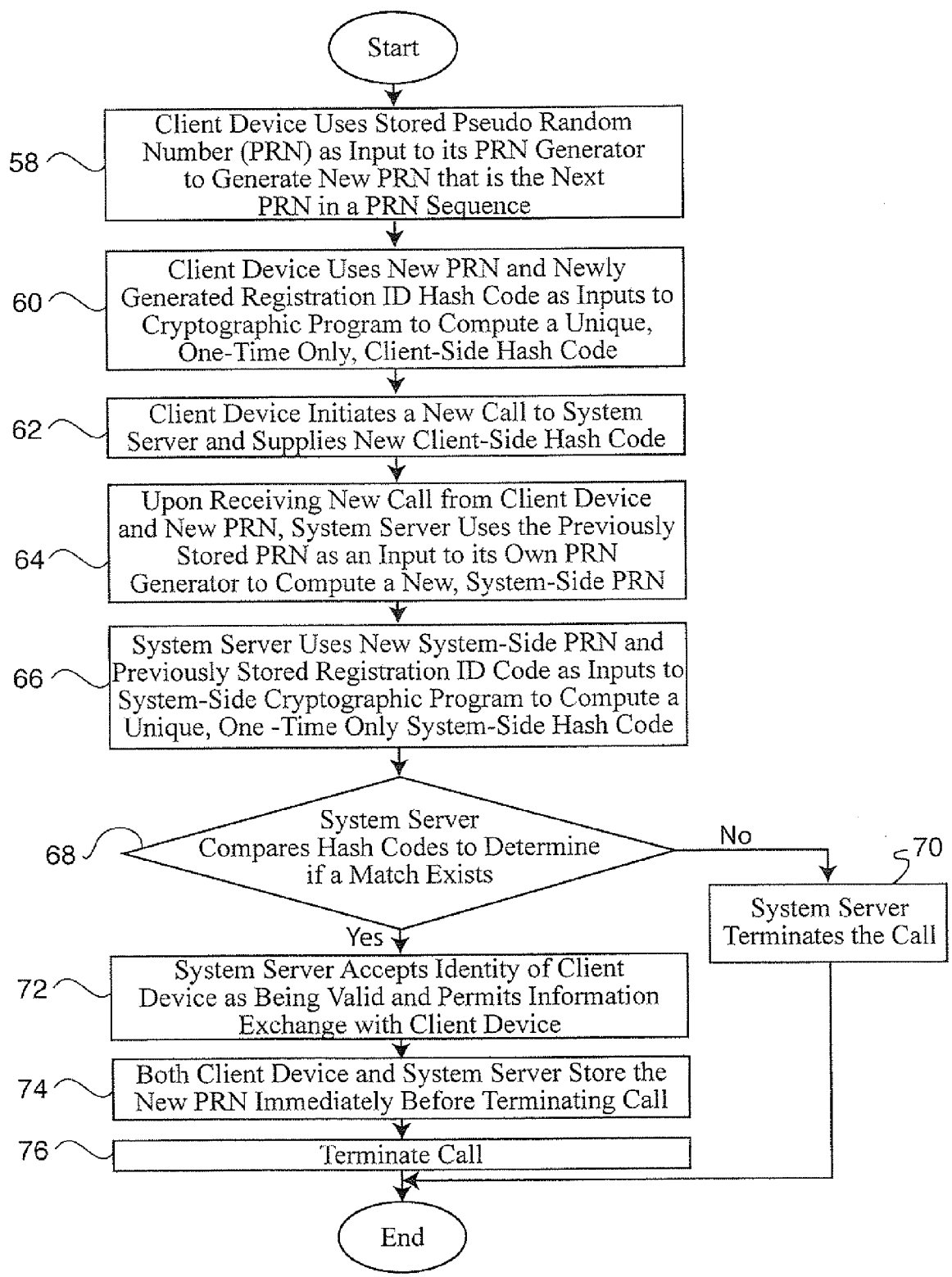
FIG. 4 is a flowchart of an exemplary future call sequence, by which the client device regenerates its ID hash code and by which the system server uses the regenerated ID hash code to authenticate the identity of the client device.

Referring now to FIG. 4, a plurality of exemplary operations for making a new, subsequent call from the client device 16 to the system 12 are set forth. It will be understood that the previous information exchange session between the client device 16 and the system server 12 has been terminated, and that the client device 16 is now calling the system server 12 and attempting to begin a new information exchange session.

In operation 58, the client device 16 uses the stored PRN code generated from the previous information exchange session as an input to its PRN generator 27 to generate a new PRN that represents the next PRN in the PRN sequence. At operation 60 the client device 16 uses the new PRN and the newly generated registration ID code as inputs to a cryptographic hash program operating in connection with the client device 16. The cryptographic hash program may be stored on the hard disc drive 26 of the client device 12 or stored on another non-volatile storage medium that is in communication with the computing module 22 of the client device 16. The cryptographic hash program generates a one time only "client-side" hash code that uniquely identifies the particular client device 16 that is about to make a new call to the system server 12.

At operation 62, the client device 16 then initiates a new call to the system server 12 and supplies the new client-side hash code to the system server 12. At operation 64, upon receiving the new call from the client device 16 and being presented with the new client-side hash code, the system server 12 uses the previously stored PRN for the client device 16 that is now making a new call to it, as an input to its own PRN generator 12a. From this operation, the system server 12 generates a new "system-side" PRN code that is the next PRN code in the PRN sequence.

At operation 66, the new system-side PRN code and the stored registration ID code previously presented by the client device 16 are then used as inputs to a cryptographic hash program that is stored on a memory medium (e.g., hard disc drive or other non-volatile memory) associated with the system server 12. This operation generates a unique, one time only, "system-side" hash code.

It will be appreciated that the cryptographic hash program used by the client device 16 and the cryptographic hash program used by the system server 12 are identical programs that will generate the same output hash code, given the exact same inputs. Similarly, the PRN generator 27 of the client device 16 and the PRN generator 12a of the system server 12 are identical, and therefore will generate identical PRN codes given the exact same input.

At operation 68, the system server 12 compares the system-side hash code to the client-side hash code to see if they match. If they do not, the system server 12 terminates the call that the client device 16 is making, as indicated at operation 70. If they do match, then this authenticates the identity of the client device 16 to the system server 12, as indicated at operation 72. The system server 12 then allows an information exchange session to be conducted between it and the client device 16. Preferably immediately before concluding the call, the system server 12 and the client device 16 both store their new (i.e., identical) PRN codes in their respective memories, as indicated at operation 74. The call is then terminated at operation 76. Waiting until the end of a call to store the newly generated PRN codes in memory adds an additional degree of security for both the client device 16 and the system server 12, as this code will not able available to any unauthorized device that may gain unauthorized access to the client device 16 or the system server 12 on the network 14.

The method of the present disclosure provides a significant benefit in that cumbersome and/or costly procedures are not required by users of the client device 16. Since the registration ID code is obtained from a combination of factors derived from the hardware characteristics of the particular client device 16 the network address of the client device 16, this makes it virtually or entirely impossible for an unauthorized device to generate a registration ID code that fraudulently identifies itself as an authorized client device. Furthermore, an additional layer of security is provided because credential information supplied by the user cannot be obtained or derived by reading any files from the client device 16. Also, since a new pseudo random number code is a "one-time-only" code that is generated each time the client device 16 calls the system server 12, there is no virtually no risk that an unauthorized device can obtain and/or use this code. Finally, since a new, "one-time-only" hash code is generated by the client device 16 each time it contacts the system server 12, this virtually eliminates the possibility that an unauthorized device can obtain it and use it to access the system server 12. These features, overall, enable an extremely high degree of certainty to be obtained when authenticating the identity of a particular client device that is attempting to establish communications with the system server 12. The system and method of the present disclosure makes it possible to provide for highly secure communications over an unsecured line.

While various implementations and embodiments have been described, those skilled in the art will recognize modifications or variations which might be made without departing from the present disclosure. The examples illustrate the various implementations and embodiments and are not intended to limit the present disclosure. Therefore, the description and claims should be interpreted liberally with only such limitation as is necessary in view of the pertinent prior art.

What is claimed is:

1. A method for assuring that a client device is authorized to receive information from a system, the system and the client device being in bi-directional communication over a network, the method comprising:

using at least two different pieces of identifying information unique to a client device as an input for a cryptographic hash function, to generate a unique registration ID code for said client device;

when said client device contacts said system, then using said system to evaluate said unique registration ID code together with an additional piece of user identifying information, to authenticate an identity of said client device;

using said system to generate a unique pseudo random number (PRN) and storing the PRN;

supplying said unique PRN to said client device for said client device to store as an initial PRN and use when making a subsequent call to said system for information from said system during a bidirectional communications session;

prior to initiating said subsequent call, causing the client device to re-generate the unique registration code using the at least two different pieces of identifying information;

prior to initiating said subsequent call, causing said client device to use a PRN generator associated with the client device to generate a new PRN using said initial PRN previously stored by said client device, and using said new PRN, together with said re-generated unique registration code, in generating a new, one-time only client side hash code;

causing said client device to contact said system and to present only said new, one-time only client side hash code to said system as information identifying said client device to said system; and for each subsequent time that the client device attempts to initiate a new bidirectional communications session with the system:

causing the client device to first perform the cryptographic hash function to regenerate the unique registration ID code;

causing the client device to use the PRN generator and a most recently stored PRN that originated from the initial PRN most recently stored by the client device, to generate another new PRN;

using the another new PRN and the regenerated unique registration ID code to generate another, new, one-time hash code that is presented to the system to verify an identify of the client device; and for each time the client device contacts the system, causing the system to use a PRN generator configured identically with the PRN generator of the client device to generate a new system PRN using the most recently stored PRN by the system.

2. The method of claim 1, further comprising:

causing said system to determine a new system-side PRN using said most recently stored PRN;

causing said system to use the registration ID code and said new system-side PRN as inputs to said cryptographic hash function, to generate another hash code;

causing said system to compare said new, one-time only client-side hash code with said another hash code; and if said new, one-time only client-side hash code matches said another hash code, then validating an identity of said client device and permitting further communications with said system.

3. A method for assuring that a client device is authorized to receive information from a system, the system and the client device being in bi-directional communication over a network, the method comprising:

reading a plurality of predetermined pieces of information from said client device pertaining to a hardware component of said client device;

using a cryptographic program to receive said predetermined pieces of information as an input, and to generate therefrom a registration identification (ID) code for said client device;

using said client device to supply said registration ID code, and at least one additional piece of user identifying information, to said system when making a call to said system to establish an information exchange session with said system over said network;

causing said system to use said registration ID code and said piece of user identifying information to initially authenticate said client device as a predetermined client device that is authorized to receive information from said system;

using a first pseudo random number generator to generate a pseudo random number, in response to determining that said client device is authorized to receive information from said system;

transmitting said pseudo random number to said client device for storage on said client device to produce an initial stored pseudo random number, and for use in a subsequent communication to said system to identify said client device as a specific client device authorized to receive information from said system;

for each subsequent attempt at initiating a new call to said system, prior to initiating said new call to said system, causing said client device to use said an immediately previously stored pseudo random number originating from the initial stored pseudo random number and a second pseudo random number generator, identical to said first pseudo random number generator, to generate a new pseudo random number (PRN);

causing said client device to re-generate said registration ID code using said predetermined pieces of information; and causing said client device to use the new PRN and the re-generated registration ID code in generating a first, one-time only hash code that identifies said client device.

4. The method of claim 3, further comprising storing said initial pseudo random number on said system.

5. The method of claim 4, wherein the new pseudo random number represents the next pseudo random number in a pseudo random number sequence; and storing said new pseudo random number on said client device.

6. The method of claim 5, further comprising:

at said system, using said first pseudo random number to generate a new pseudo random number, and using said new pseudo random number and said registration ID code to generate a second, one-time only, unique hash code;

comparing said first and second one-time only unique hash codes; and if said first and second one-time only hash codes match, then concluding that said client device is authorized to establish an information exchange session and permitting subsequent exchange of information between said system and said client device.

7. The method of claim 6, wherein reading a plurality of predetermined pieces of information comprises reading a volume serial number identification code of a primary partition of a mass storage device associated with said client device.

8. The method of claim 6, wherein using said client device to supply said piece of user identifying information comprises using said client device to supply at least one of:
a user name; and
a user password.

9. The method of claim 6, wherein using said client device to supply said piece of user identifying information comprises using said client device to supply at least two of the following:
a user name;
a user password; and
a registration name for said client device.

10. The method of claim 9, wherein said client device supplies the registration name for the client device;
wherein said system, upon receipt of said registration name from said client device when said client device calls said system, checks if another device using the same registration name as said client device is already in communication with said system; and
wherein said system terminates said call by said client device if said registration name is detected by said system to already be in use by a device other than said client device.

11. The method of claim 3, wherein reading a plurality of predetermined pieces of information from said client further comprises reading a network address of said client device on said network, and using said network address as an input for said cryptographic program.

12. The method of claim 11, wherein the operations of reading a network address and reading a predetermined piece of information comprise using a registration program residing on a mass storage device of said client device; and
wherein using a cryptographic program comprises using a one-way cryptographic hash function.

13. The method of claim 12, wherein reading said network address comprises reading a MAC address of a network card residing within said client device.

14. A method for assuring that a client device is authorized to receive information from a system, the system and the client device being in bi-directional communication over a network, the method comprising:
reading a network address of a network card being used in said client device to enable communication on said network;
reading a predetermined piece of information from said client device pertaining to a non-volatile, mass storage component operating with said client device;
using a cryptographic hash function to receive said network address and said predetermined piece of information as inputs, and to generate therefrom a registration identification (ID) code for said client device;
using said client device to supply said registration ID code, and at least one additional piece of user identifying information, to said system when making an initial call to said system over said network;
using said system to control a first random number generator to generate a first pseudo random number (PRN), in response to determining that said client device is authorized to receive information from said system;
transmitting said first PRN to said client device;
storing said first PRN on said client device to create an initial stored PRN;
causing said system to store said first PRN;
causing said client device to use said initial stored PRN and a second pseudo random number generator, identical to said first pseudo random number generator, to generate a new pseudo random number (PRN);
prior to initiating each subsequent call to the system, causing the client device to regenerate the registration ID code; and
causing said client device to use the new PRN and the re-generated registration ID code to assist in generating a new, one-time only hash code that identifies said client device, prior to said client device making a new call to said system.

15. The method of claim 14, further comprising:
transmitting the new, one time only hash code to the system during a subsequent authentication operation.

16. The method of claim 15, further comprising:
causing said system to generate said new PRN using the first pseudo random number generator and its said first stored PRN;
causing said system to use the registration ID code and said new PRN as inputs to said cryptographic hash function, to generate another hash code;
causing said system to compare said new, one-time only hash code with said another hash code; and
if said new, one-time only hash code matches said another hash code, then authenticating an identity of said client device and permitting further communications with said system.

17. The method of claim 14, wherein using said client device to supply said additional piece of user identifying information comprises using said client device to supply a previously selected registration name for said client device.

18. A method for assuring that a client device is authorized to receive information from a system, the system and the client device being in bi-directional communication over a network, the method comprising:
reading a network address of a network card being used in said client device to enable communication on said network;
reading a predetermined piece of information from said client device pertaining to a mass storage component incorporated in said client device;
using a cryptographic hash program to receive said network address and said predetermined piece of information as inputs, and to generate therefrom a registration identification (ID) code for said client device;
using said client device to supply said registration ID code, and user identifying information comprising at least two of the following, to said system when making an initial call to said system over said network:
a user selected password;
a user selected user name; and
a user selected device name;
causing the system to use a first pseudo random number generator to generate an initial pseudo random number (PRN), in response to determining that said client device is authorized to receive information from said system;
transmitting said initial PRN to said client device;
storing said initial PRN on said client device;
causing each of said client device and said system to store said initial PRN to create a stored initial PRN;
using said stored initial PRN in a subsequent communication to said system to identify said client device as a specific client device authorized to receive information from said system;
causing the client device to use a second pseudo random number generator identical to said first pseudo random number generator to generate a new PRN from said stored initial PRN when making a new call to said system;

causing the client device to generate a new registration ID code;

causing the client device to use the new registration ID code and the new PRN as inputs to a predetermined hash function to generate a one time only client-side hash code, and transmitting said one time only client-side hash code to said system;

causing said system to use the first pseudo random number generator to generate a new system-side PRN said stored initial PRN;

using said new system-side PRN and said registration ID code as inputs to a system-side program to cause said system to generate a unique, one time only system-side hash code;

comparing said one time only client-side hash code and said only time only system-side hash code; and allowing further communication between said client device and said system only if said one time only client-side hash code and said one time only system-side hash code match; and for each subsequent attempt by said client device to establish a new communications session with said system, causing said client device to regenerate a subsequent, new registration ID code, and to use the subsequent, new registration ID code along with a most recently stored PRN code from as inputs to said predetermined hash function to generate a subsequent, new, one time only client-side hash code that authenticates an identify of the client device to the system.

* * * * *